United States Patent

Goren

Patent Number: 5,342,565
Date of Patent: Aug. 30, 1994

[54] METHOD FOR MANUFACTURING SIMULATED GRANITE

[76] Inventor: Jacob Goren, 100 Winston Dr., Cliffside Park, N.J. 07010

[21] Appl. No.: 74,156

[22] Filed: Jun. 9, 1993

Related U.S. Application Data

[63] Continuation of Ser. No. 761,643, Sep. 18, 1991, abandoned.

[51] Int. Cl.⁵ .................. B28B 1/16; B28B 1/32; B29C 41/08; B29C 41/22
[52] U.S. Cl. .................. 264/74; 264/112; 264/113; 264/121; 264/122; 264/245; 264/255; 264/256; 264/309; 264/DIG. 57; 264/DIG. 72
[58] Field of Search .............. 264/255, 256, 245, 73, 264/74, 309, DIG. 31, DIG. 57, DIG. 72, 112, 113, 121, 122

[56] References Cited

U.S. PATENT DOCUMENTS

| | | | |
|---|---|---|---|
| 880,753 | 3/1908 | Payne | 264/255 X |
| 1,739,677 | 12/1929 | Kendall | 264/74 |
| 2,572,510 | 10/1951 | Orsini | 264/73 X |
| 2,835,996 | 5/1958 | De Paoli, Sr. | 264/333 X |
| 3,574,801 | 4/1971 | Jauker | 264/71 X |
| 4,085,181 | 4/1978 | Cosentino | 264/255 X |
| 4,085,246 | 4/1978 | Buser et al. | |
| 4,137,215 | 1/1979 | Van Gasse | 264/73 X |
| 4,159,301 | 6/1979 | Buser et al. | 264/73 X |
| 4,209,486 | 6/1980 | Ross | 264/255 X |
| 4,244,993 | 1/1981 | Platka, III et al. | 264/255 X |
| 4,698,010 | 10/1987 | Toncelli | 264/73 X |
| 4,959,401 | 9/1990 | Bellasalma et al. | |
| 5,028,459 | 7/1991 | Lathrop | 264/74 X |
| 5,166,230 | 11/1992 | Stecker | |

FOREIGN PATENT DOCUMENTS

| | | | |
|---|---|---|---|
| 229895 | 8/1960 | Australia | 264/74 |
| 28365 | 3/1979 | Japan | 264/253 |
| 4-045935 | 2/1992 | Japan | 264/245 |
| 2224283 | 5/1990 | United Kingdom | 264/71 |

*Primary Examiner*—Karen Aftergut
*Attorney, Agent, or Firm*—Ostrolenk, Faber, Gerb & Soffen

[57] ABSTRACT

Simulated granite articles manufactured by coating a mold with a gel coat and then a spray composition including a gel coat material and crushed natural granite, crushed synthetic granite and mixtures thereof. Backing material fills the remainder of the mold. Gel coat and crushed synthetic granite may be sprayed directly on the mold, with a modified spray gun being used to efficiently and uniformly spray the granite composition.

19 Claims, 3 Drawing Sheets

METHOD FOR MANUFACTURING SIMULATED GRANITE

This is a continuation of application Ser. No. 07/761,643, filed on Sep. 18, 1991, now abandoned.

BACKGROUND OF THE INVENTION

1. Field of the Invention

The present invention relates to the manufacture of products having a granite appearance and, more particularly, to the manufacture of products, such as bathtubs, sinks, tabletops, wall panels, furniture etc. of a simulated granite material.

2. Description of the Related Prior Art

Processes for the manufacture of simulated marble are well known in the art. They involve forming veins or striations in a resin matrix to create a marble-like appearance. Similarly, processes for the manufacture of tiles or slabs using pieces of solid decorative material bonded together with a binder are also known.

U.S. Pat. No. 4,244,993 to Platka, III et al. teaches a method for the manufacture of simulated marble and onyx products. A mold is initially coated with a gel coat. A mixture of a polyester resin and a filler is sprayed over the gel coat. Veins are then formed in this layer, and glass fiber, polyester resin and filler are then deposited thereon.

U.S. Pat. No. 3,773,886 to Starr et al. also teaches a method for the manufacture of simulated marble. Colored veining composition is sprayed onto a gel coating on a mold surface. Marble-like striations are created using a mixture which includes a rubbery material.

U.S. Pat. No. 880,753 to Payne et al. discloses a method for manufacturing imitation granite blocks. A granite effect is produced by applying suitable colors to the back of a layer of magnesite cement.

U.S. Pat. No. 4,085,181 to Cosentino teaches a process for the manufacture of a solid slab of conglomerate building material. Individual pieces of solid material, such as marble, onyx or granite, are placed in a mold lined with a bonding material. Additional bonding material is poured into the mold to fill the interstices between the solid material and chemically bond the solid material with the initial lining.

U.S. Pat. No. 3,303,245 to Trudeau discloses a tile product consisting of a mixture of fine and/or large mineral aggregates bonded by an epoxy resin.

U.S. Pat. No. 4,209,486 to Ross teaches a process for inlaying a design in molded, simulated marble.

However, an economical and efficient method for manufacturing simulated granite products is not known from the prior art.

SUMMARY OF THE INVENTION

Accordingly, it is an object of the present invention to provide an improved method for the manufacture of simulated granite.

This and other objectives are achieved by the method for manufacturing a simulated granite product in accordance with the invention. The method includes applying a substantially clear, hardenable resin coating onto a mold to form a first, protective layer of the granite product. A composition including the same hardenable resin and either crushed natural granite, crushed synthetic granite or a mixture thereof is then sprayed onto the first, protective layer to form the granite-like appearance of the simulated granite product. Backing material fills the remainder of the mold.

Preferably, the hardenable resin coating is sprayed onto the mold until a coating thickness of about 8 to about 20 mil is obtained. A coating thickness of about 8 to about 10 mil may be employed, in which case the composition is sprayed under low pressure, preferably at about 10 to about 12 psi, onto the hardenable resin coating before it dries. Alternatively, the hardenable resin may be coated onto the mold in a thickness of about 10 to about 20 mil. If so, the coating is allowed to dry, preferably for about 20 to about 30 minutes, prior to spraying the resin and granite composition thereon which is cured after spraying. In any event, the backing material is preferably a polyester resin and may include either limestone, fiberglass, sand or mixtures of these materials.

The protective layer may be omitted. If so, a composition including the hardenable resin material and a crushed synthetic granite is sprayed directly onto a mold, preferably to a thickness of about 18 to about 25 mil, and then cured for about 20 to about 30 minutes. Backing material, as discussed above, is then applied to the coating.

As used herein, the term "granite" is meant to include natural granite, synthetic granite and a mixture of natural and synthetic granite, unless otherwise noted.

DETAILED DESCRIPTION OF THE PREFERRED EMBODIMENT

Figure 1:
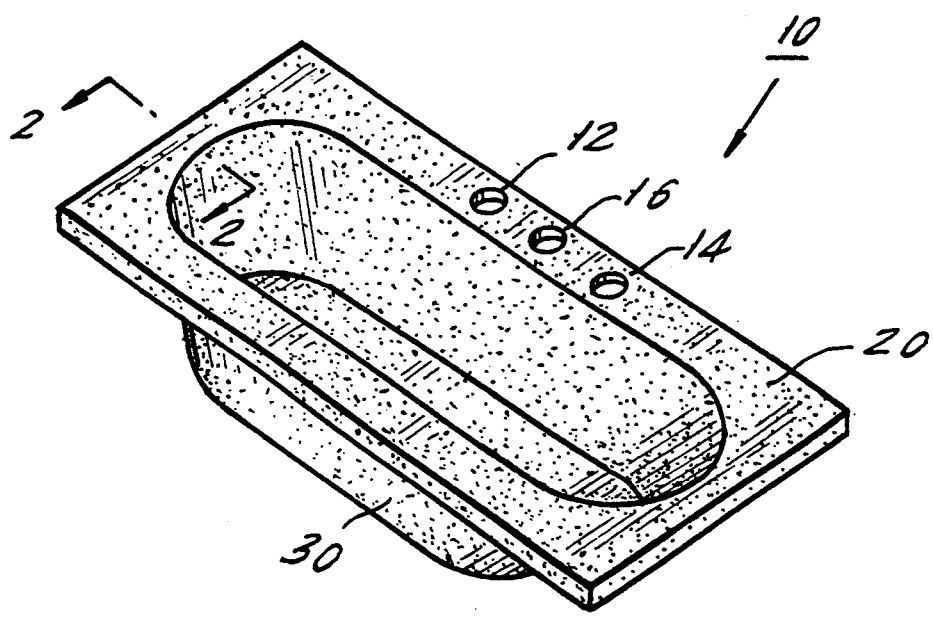
FIG. 1 is a perspective view of a simulated granite product manufactured according to the present invention.
Figure 2:
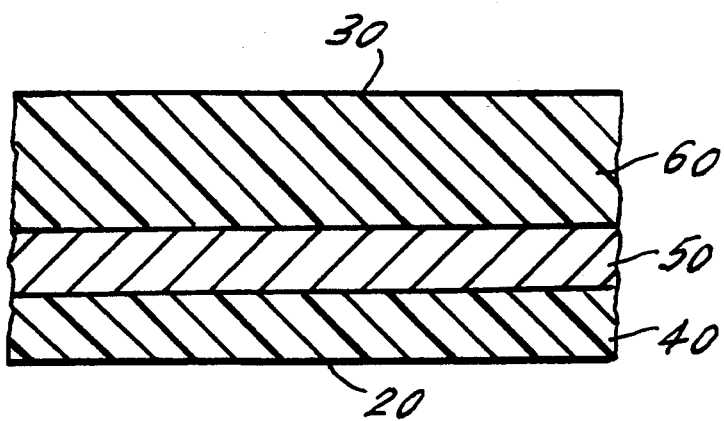
FIG. 2 is a partial, cross-sectional view taken along lines 2—2 of FIG. 1 showing the various layers of material that comprise the simulated granite product manufactured according to the present invention.
Figure 3:
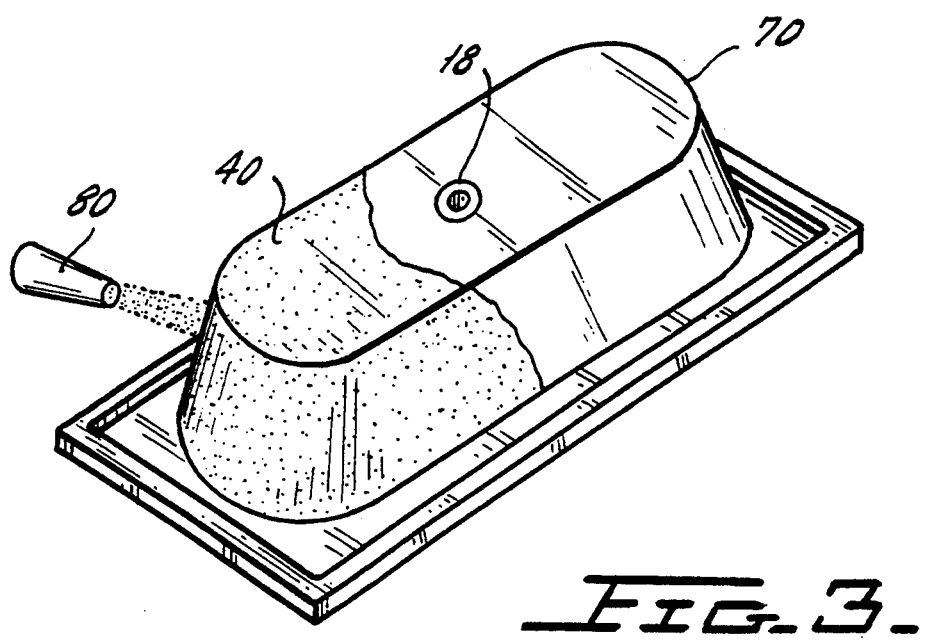
FIG. 3 is a perspective view of the first step in the manufacture of the simulated granite product shown in FIGS. 1 and 2, including the step of applying a hardenable resin coating onto a mold.

Referring now to the drawings wherein like numbers indicate like elements, there is shown in FIG. 1 a simulated granite sink product 10 manufactured in accordance with the present invention. It will be understood, however, that the method of the invention can be used to manufacture any type of simulated granite product, such as bathtubs, sanitaryware, toilets, furniture, tiles for use in bathrooms and kitchens and any other product where a granite look is desired. Sink 10 includes apertures 12, 14, 16 and 18 (see FIGS. 3-5) for hot and cold water handles, a faucet and a drain, respectively. Referring to FIG. 2, inner surface 20 of sink 10 is a layer of a clear resin 40 referred to herein as a "gel coat". The gel coat is a clear, hardenable polyester resin, such as taught by U.S. Pat. No. 4,244,993 which is herein incorporated by reference. An especially preferred gel coat is a neopentyl glycol-based gel coat formulated with 100% neopentyl glycol as the glycol component of the polyester and 100% isophthalic acid as the acid component which is available from HK Research Corporation of Hickory, N.C., 28603-1809. A layer 50 of granite and gel coat material is disposed between gel coat 40 and outer layer 60 which is a layer of any suitable backing material, such as polyester resin which may be combined with fillers such as limestone, fiberglass, sand, etc.

The first step in the manufacture of product 10 (FIG. 3) is the application of gel coat layer 40 onto mold 70. Gel coat layer 40 may be applied using any suitable means such as a spray gun 80, brush (not shown) or the like. Generally, about 8 to about 20 mil of gel coat is applied onto mold 70. About 8 to about 10 mil of gel coat 40 may be sprayed onto mold 70 and, if so, gel coat layer 40 is not allowed to dry, but rather layer 50 is sprayed onto wet gel coat 40 at a low pressure, preferably about 10 to about 12 psi. Alternatively, about 15 to about 20 mil of gel coat may be applied onto mold 70. In this situation, gel coat layer 40 is allowed to dry completely at room temperature, preferably for about 20-30 minutes.

Figure 4:
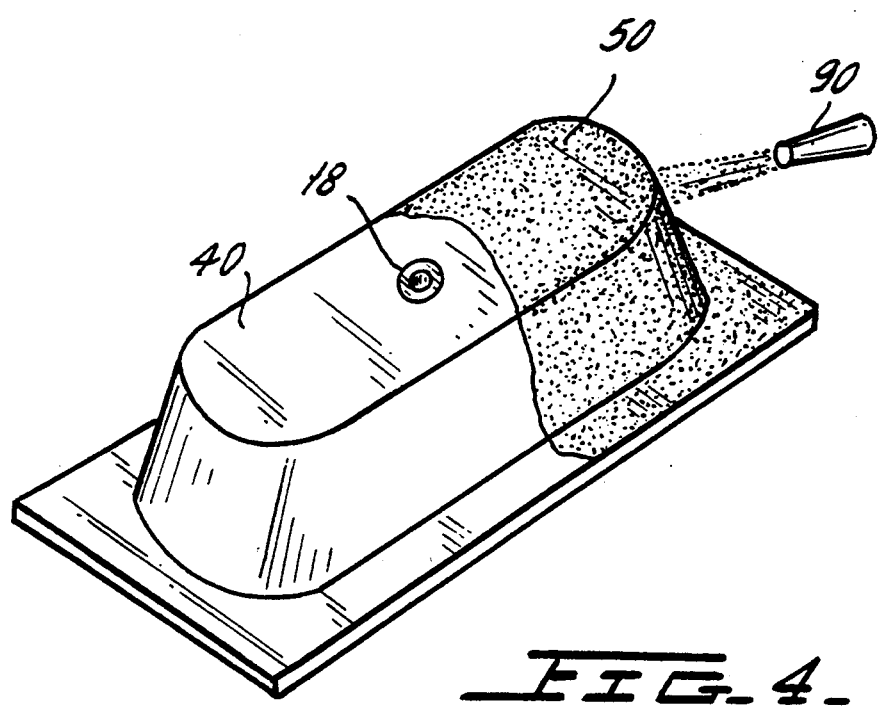
FIG. 4 is a perspective view of the second step including spraying a composition including hardenable resin material and granite onto the coated mold.

Referring to FIG. 4, the second step in the manufacture of product 10 is the spraying of a composition including granite and gel coat material onto the coated mold. This layer provides the simulation of granite in product 10. Preferably, this composition includes about 50 to about 65 wt. % gel coat material, (depending on the particle size of the granite) and the remainder granite. Preferably, the granite particles have a mesh size of between about #140 and about #8, most preferably between about #140 and about #10. This composition is preferably sprayed onto the mold (which is coated with gel coat) using spray gun 90 which will be described in detail below to a thickness of about 12 to about 25 mil. It should be cured prior to application of the backing material in the next step. The curing may be conducted by any suitable means, and the composition must include a catalyst, such as about 1 to about 2% methyl-ethyl-ketone-peroxide to accelerate curing.

Gel coat layer 40 may be omitted from the product 10 and granite and gel coat composition 50 sprayed directly onto mold 70. If so, synthetic granite should be employed in order to ensure proper stain resistance in product 10.

Figure 6:
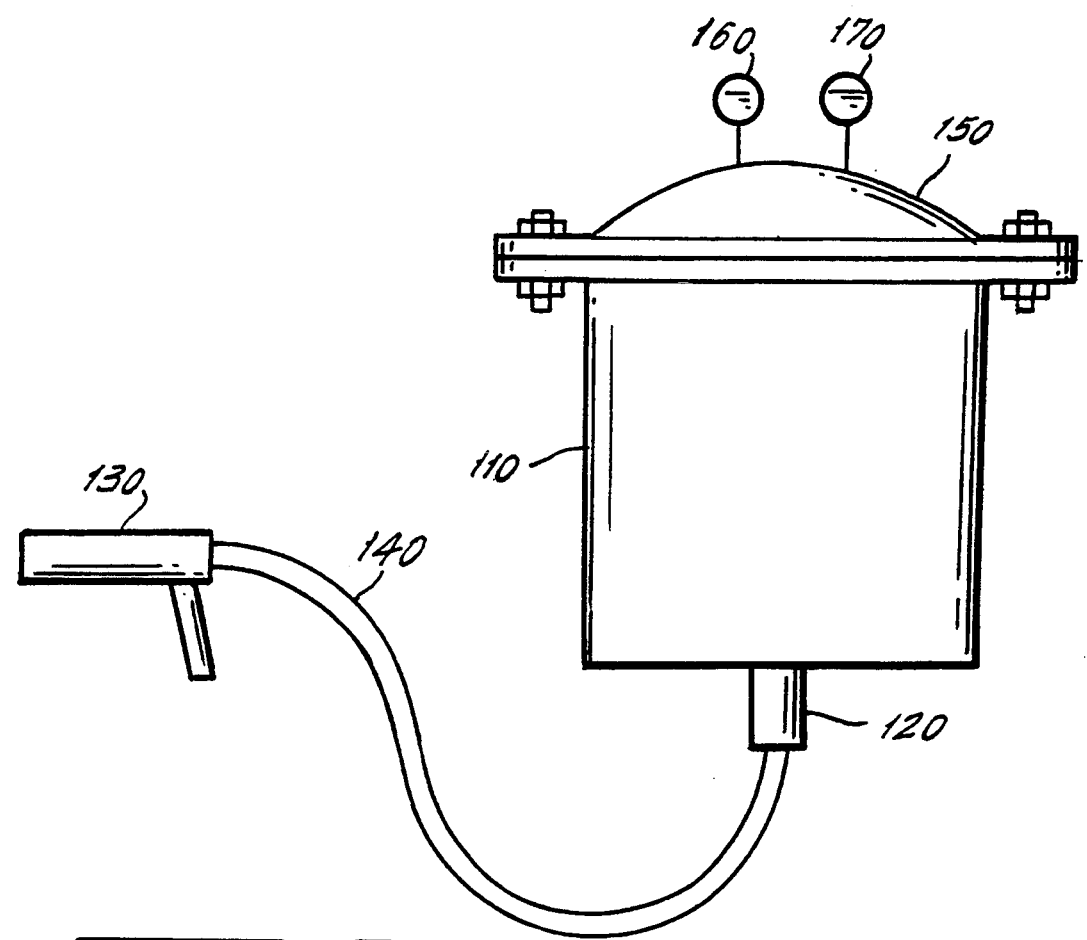
FIG. 6 is a schematic view of a spraying apparatus for spraying the resin and granite composition.

Referring to FIG. 6, to spray the granite and resin mixture 50, conventional spraying apparatus is modified because the composition is too viscous to be sprayed from a conventional spray gun. A mixture of gel coat material and granite is placed in a pressure pot 110, and the bottom discharge 120 of the pressure pot is connected to a spray gun 130 by connecting hose 140 which is a pressure hose with a larger than normal diameter, preferably about ½" minimum. Pressure pot 110 also includes a cover 150 bolted or clamped to pot 110 and suitable gauges 160 and 170 for air and pressure regulation.

Spray gun 130 may be any suitable spray gun. One such spray gun is known as BINKS 18N, which is available from Binks Manufacturing Company, 9201 West Belmont Avenue, Franklin Park, Ill. 60131. The spray gun is modified to improve delivery of the mixture of gel coat and granite because this composition has a viscosity such that a conventional spray gun is unable to uniformly and efficiently spray the material. The discharge holes in the conventional spray gun are redrilled to increase the diameter of the holes to about ¼ inch thereby permitting the mixture to be efficiently and uniformly sprayed. Furthermore, the needle valve typically used in a conventional spray gun to control the discharge of the material to be sprayed is removed. As a result, the discharge of the material is no longer controlled by the spray gun trigger. A valve is attached at the ingress point of the spray gun to control the flow of material into the spray gun. Preferably, a ½" valve is used. If an external catalyst is used in combination with the granite gel coat mixture, an air/catalyst integrator valve, such as Binks model 102-3370 A.C.I. valve which is also available from Binks Manufacturing Company is attached to the spray gun to mix the granite and resin mixture with the catalyst, as the mixture and catalyst are being applied.

Figure 5:
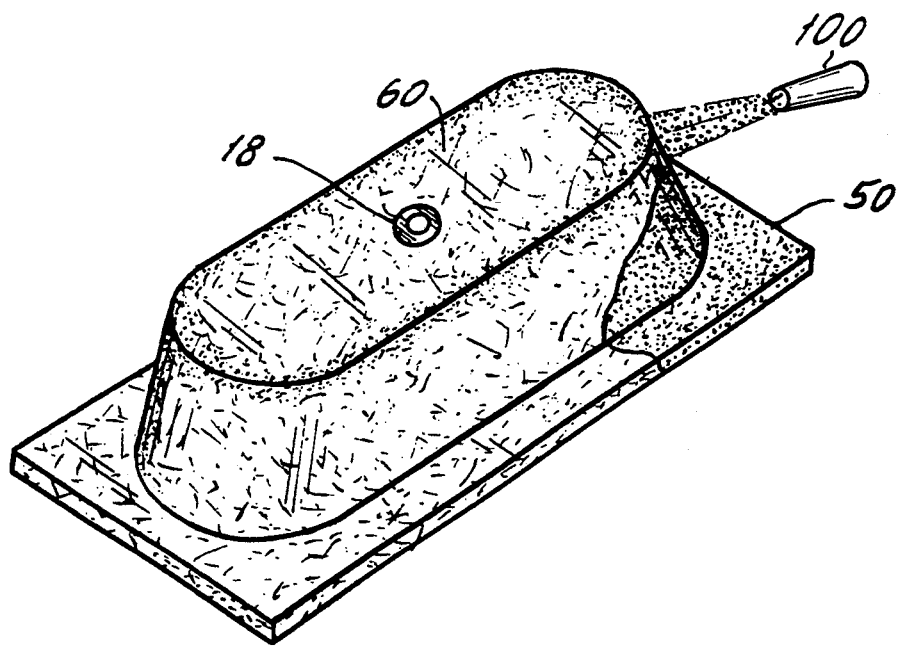
FIG. 5 is a perspective view of the third step including applying a backing material over the resin and granite composition.

Referring to FIG. 5, the third step in the manufacture of product 10 is the application of backing 60. Any suitable backing material may be used. Preferably, the backing material is polyester resin and it may include fillers such as limestone, fiberglass, sand, etc., and a catalyst to set this layer. It may be applied by any suitable means, including spray gun 100, or casting.

Although the present invention has been described in connection to a preferred embodiment thereof, many other variations and modifications and other uses will become apparent to those skilled in the art. It is preferred, therefore, that the present invention be limited not by the specific disclosure herein, but only by the appended claims.

What is claimed is:

1. A method for manufacturing a simulated granite product, comprising the steps of:
    a) applying a substantially clear, hardenable resin onto a mold to form a first, protective layer of the granite product;
    b) spraying a composition comprising:
       i) a substantially clear, hardenable resin; and
       ii) a material selected from the group consisting of crushed natural granite, crushed synthetic granite and mixtures thereof; onto the layer formed in step a) to form a simulated appearance of granite in the granite product, wherein the composition is efficiently and uniformly sprayed with a modified spray gun having discharge holes redrilled to about ¼ inch in diameter, and with a trigger valve deactivated by removing a needle therefrom, the trigger valve being replaced by a ½ inch valve attached at an ingress point of the spray gun to control flow of the composition into the spray gun; and
    c) applying a backing material to the composition sprayed onto the layer in the mold in step b) to produce the simulated granite product.

2. The method of claim 1, wherein step a) comprises spraying the resin onto the mold.

3. The method of claim 2, wherein step a) comprises spraying the resin onto the mold until a coating thickness between about 8 and about 20 mil is obtained.

4. The method of claim 3, wherein step a) comprises spraying the resin onto the mold until a coating thickness between about 8 and about 10 mil is obtained.

5. The method of claim 4, wherein the composition sprayed in step b) is sprayed onto the layer formed in step a) prior to drying of the layer.

6. The method of claim 5, wherein the composition sprayed in step b) is sprayed under low pressure onto the layer formed in step a).

7. The method of claim 6, wherein the composition sprayed in step b) is sprayed at a pressure of about 10 to about 12 psi. onto the layer formed in step a).

8. The method of claim 3, wherein step a) comprises spraying the resin onto the mold until a coating thickness between about 10 to about 20 mil is obtained.

9. The method of claim 8, further comprising the step of drying the resin applied in step a) prior to spraying the composition thereon.

10. The method of claim 9, wherein the resin applied in step a) is dried for about 20 to about 30 minutes.

11. The method of claim 8, further comprising the step of curing the composition sprayed in step b).

12. The method of claim 1, wherein the backing material comprises polyester resin.

13. The method of claim 12, wherein the backing material further comprises a filler material selected from the group consisting of limestone, fiberglass, sand and mixtures thereof.

14. A method for manufacturing a simulated granite product, comprising the steps of:
  a) spraying a composition comprising a substantially clear, hardenable resin and a crushed synthetic granite material directly onto a mold without any intervening protective layer to form a simulated appearance of granite in the produce, wherein the composition is efficiently and uniformly sprayed with a modified spray gun having discharge holes redrilled to about ¼ inch in diameter, and with a trigger valve deactivated by removing a needle therefrom, the trigger valve being replaced by a ½ inch valve attached at an ingress point of the spray gun to control flow of the composition into the spray gun; and
  b) applying a backing material to the composition sprayed onto the mold in step a) to form the simulated granite product.

15. The method of claim 14, wherein step a) comprises spraying the composition onto the mold until a coating thickness of about 12 to about 25 mil is obtained.

16. The method of claim 14, further comprising the step of curing the composition sprayed onto the mold in step a).

17. The method of claim 16, wherein the composition sprayed onto the mold in step a) is cured for about 20 to about 30 minutes.

18. The method of claim 14, wherein the backing material comprises polyester resin.

19. The method of claim 18, wherein the backing material further comprises a filler material selected from the group consisting of limestone, fiberglass, sand and mixtures thereof.

* * * * *